United States Patent [19]

Krick et al.

[11] 3,755,695

[45] Aug. 28, 1973

[54] SOLID STATE MOTOR CONTROL CYCLING TIMER

[75] Inventors: John B. Krick, Joppa; Bernard Coleman, Westminster, both of Md.

[73] Assignee: Rowan Controller Inc., Westminster, Md.

[22] Filed: Apr. 24, 1972

[21] Appl. No.: 246,609

[52] U.S. Cl. .......... 307/293, 307/141.4, 307/252 N, 307/252 F, 317/141 S, 328/130

[51] Int. Cl. ...................... H03k 17/26, H01h 47/18

[58] Field of Search .................... 307/252 N, 252 F, 307/293, 283, 141, 141.4; 328/129–131; 317/141 S

[56] References Cited

UNITED STATES PATENTS

| | | | |
|---|---|---|---|
| 3,558,996 | 1/1971 | Mitchell et al. | 317/141 S |
| 3,575,639 | 4/1971 | Shaw et al. | 317/141 S |
| 3,577,011 | 5/1971 | Raffaelli et al. | 307/293 X |
| 3,641,397 | 2/1972 | Elliot et al. | 317/141 S |
| 3,644,793 | 2/1972 | Ilk | 317/141 S |
| 3,688,130 | 8/1972 | Granieri | 307/252 F |

*Primary Examiner*—Stanley D. Miller, Jr.
*Attorney*—Ostrolenk, Faber, Gerb & Soffen

[57] ABSTRACT

A solid state timer for providing alternating "on" and "off" time periods for controlling relays, contactors, solenoids and the like and especially adapted for use with industrial control circuits. The "on" and "off" periods may be independently adjusted as to their time intervals. The circuitry is designed so as to automatically begin with the "on" timer period first. The separate adjustable timing circuits are interrelated so as to cause the initiation of an "off" timing period only after the initiation of an "on" timing period and vice versa. A resetting circuit is provided to reset all timing capacitors once line voltage has been removed, as well as assuring the fact that the cycling timer will always start with the "on" time period upon the reapplication of line voltage.

9 Claims, 1 Drawing Figure

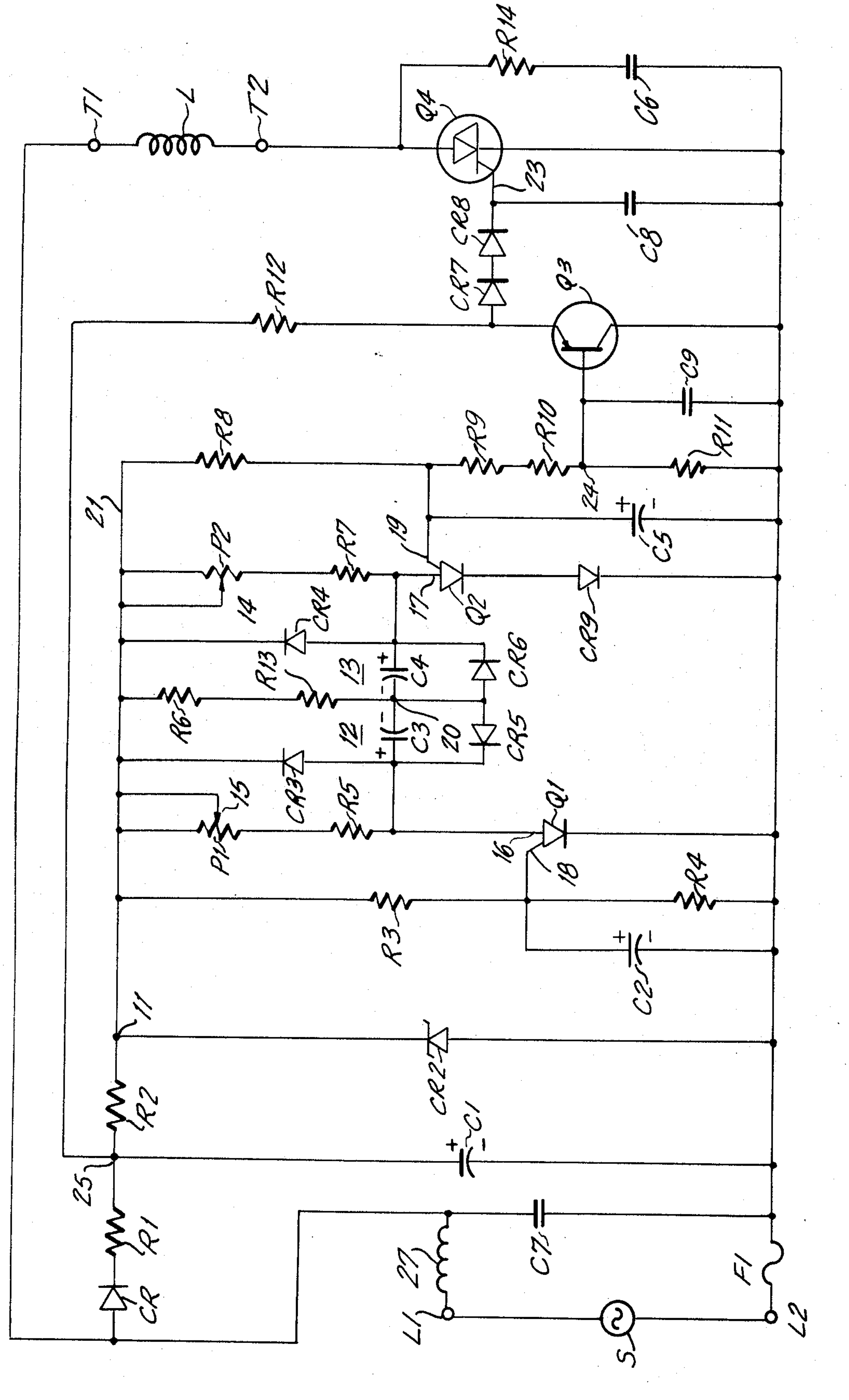
T1
L
T2
R14
Q4
C6
23
CR7 CR8
C8
R12
Q3
C9
R8
R9
R10
R11
21
24
C5
P2
R7
19
14
CR4
17
Q2
CR9
CR6
R13
13
C4
R6
12
C3
20
CR5
CR3
R5
15
P1
Q1
16
18
R4
R3
C2
11
CR2
R2
C1
25
R1
C7
27
CR
L1
S
F1
L2

SOLID STATE MOTOR CONTROL CYCLING TIMER

The present invention relates to control circuits and more particularly to a novel cycling timer for use in connection with industrial control circuits to provide cycling "on" and "off" time periods which are independently adjustable.

A BRIEF DESCRIPTION OF THE INVENTION

The present invention is characterized by providing a cycling timer having two independent and interrelated timing circuits so as to be capable of providing an "on" timing interval followed by an "off" timing interval, both timing intervals being independently adjustable and with this sequence of timing intervals recycling itself in a repeating fashion with the repeat accuracy of + or − 0.5 percent.

The present invention is comprised of means coupled to the line voltage for providing a substantially highly regulated D.C. output for use in biasing the timing circuitry and providing the necessary signal outputs for controlling an electronic output switch which may, for example, be a triac. Each of the timing circuits are provided with RC timing elements having their outputs coupled to one input terminal of a voltage detector/trigger circuit whose other input terminal is coupled to means for establishing a reference voltage. The output of the voltage detector/trigger circuit associated with the "on" timing circuit is coupled through an emitter follower amplifier to the triac switch for controlling turns "on" and turn "off" of the electronic switch. Upon turn on of the circuit the reference voltage supply circuits are provided with time delay devices of differing values with the "on" timing circuit having the shorter time delay to assure that the "on" timing cycle will be the first one initiated, thereby causing the electronic switch to close a predetermined time delay after the application of line voltage to the cycling timer circuit. After turn on of the "on" timing circuit, the timing element of the "off" timing circuit begins to time out and, depending upon the time delay to which it has been set, causes turn on of the voltage detector/trigger associated with the "off" timing circuit which automatically causes turn off of the voltage detector/trigger associated with the "on" timing circuit. This operation causes turn off of the electron switch and automatically initiates a timing period for the timing element of the "on" timing circuit which, after its adjustable time delay has elapsed, triggers its associated voltage detector trigger on so as to automatically cut off the voltage detector/trigger associated with the "off" timing circuit, as well as simultaneously turning the electronic switch on. This cycle is then continuously repeated with the actual time intervals of the "on" and "off" cycles being adjustable over a range of from 0.5 − 50 seconds.

OBJECTS OF THE INVENTION

It is therefore one primary object of the present invention to provide a novel solid state cycling timer for use in industrial control applications and the like in which the "on" and "off" time intervals are independently adjustable.

Another object of the present invention is to provide a novel solid state cycling timer for use in industrial control circuits and the like which is adapted to automatically initiate an "on" timing cycle upon initial start up of the system or upon subsequent start up which may occur as a result of loss of power.

A BRIEF DESCRIPTION OF THE FIGURE

The above as well as other objects of the present invention will become apparent when considering the accompanying description and drawing in which the sole FIGURE shows a schematic diagram of a solid state cycling timer designed in accordance with the principles of the present invention.

DETAILED DESCRIPTION OF THE DRAWING

The sole FIGURE shows a schematic diagram of a solid state cycling timer which is an electronic timing relay utilizing solid state components in a high performance timing circuit to provide alternate "on" and "off" time periods for controlling relays, contactors, solenoids, and the like and is especially advantageous for use in industrial control circuits. The "on" and "off" periods may be independently adjusted for timing intervals in the range from 0.5–50 seconds by means of adjustable potentiometers provided in the associated timing circuits. The output of the timer is a single pole normally open solid state switch. The timer is preferably adapted for use with an input voltage of the order of 120 volts RMS +10% − 15% and may be used with either 50 or 60 Hz input voltage sources. The voltage sensitivity of the circuitry is ± 0.5% per 10% line voltage change and the repeat accuracy of the circuit is ± 0.5% after the first operation at constant voltage and temperature. The reset time, which is the minimum power "off" time tequired to achieve specified accuracy upon restart is of the order of 2 seconds.

As shown in the sole FIGURE, the load L to be controlled is connected between terminals T1 and T2. A line voltage source S is connected between input terminals L1 and L2. Once the 120 volt power source is applied to the cycling timer input terminals, the solid state single pole normally open output switch will close for he preset "on" period and then switch "off" for the preset "off" period and continue to repeat this "on"-"off" cycling at the preset (adjustable) time intervals.

The solid state cycling timer 10 is provided with a half wave rectifier and filter circuit comprised of resistor R1, diode CR1 and capacitor C1 to provide a source of unregulated D.C. voltage for powering the timing and output circuits.

In order to achieve the specified accuracy over the specified line voltage and operating ambient range, the timing circuit requires a regulated supply voltage. The regulated voltage source consists of zener diode CR2 and resistor R2 to produce a regulated output voltage at common terminal 11 between R2 and CR2.

TIMING CIRCUIT

The cycling timer is provided with two timing circuits 12 and 13, the timing circuit 13 being comprised of a potentiometer P2 having an adjustable arm 14 and a capacitor C4 for establishing the "on" time period. Timing circuit 12 is comprised of a potentiometer P1 having an adjustable arm 15 and a capacitor C3. First and second voltage detectors/triggers comprised of programmable unijunction transistors (PUT) Q1 and Q2 are each associated with the "off" and "on" timing circuits and are provided to be triggered on once a voltage on their respective anode terminals 16 and 17 exceed the reference voltages applied to their respective gate terminals 18 and 19 by the order of a fraction of 1 volt. The "on" period voltage reference circuit is comprised of voltage divider elements R8, R9, R10 and R11 and a filter capacitor C5 connected in parallel across R9, R10 and R11 so as to provide a filtered reference voltage source of a predetermined D.C. voltage level. The "off" period voltage reference source consists of a voltage divider comprised of resistors R3 and R4 and a filter capacitor C2 connected in parallel across resistor R4 to provide a similar filter reference voltage source of the same D.C. level as the filter voltage reference source for the "on" timing circuit.

Capacitors C2 and C5 function as filters to prevent negative transients which may appear in the D.C. supply circuit from triggering the PUT permaturely.

Immediately after line voltage is applied to terminals L1 and L2, filter capacitor C1 begins to charge in half wave increments toward an average D.C. level. The voltage on the "on" and "off" reference voltage level circuits will also attempt to charge toward their preset levels. However, the voltage of the "off" period reference voltage circuit charges at a rate of the opder of one-tenth the charging rate of the "on" reference voltage circuit due to the fact that the capacitance of element C2 is of the order of 10 times greater than the capacitance of element C5. During this charging period, the anode voltage of PUT Q1 and Q2 will increase at the same rate by way of the series circuits comprising elements R6, R13 and CR5 for Q1 and elements R6, R13 and CR6 for Q2. Once the voltage at anode 16 exceeds the voltage across C2 by the aforementioned predetermined amount, Q1 triggers on and remains on due to the holding current through the series branch comprised of R6, R13 and CR5. The voltage at the anode 16 of Q1 remains constant and is of the order of slightly less than 1 volt during this period.

The voltage at the common terminal 20 berween timing capacitors C3 and C4 is of the order of a fraction of a volt higher than the voltage at anode 18 of Q1 due to the diode drop across CR5. The voltage across capacitor C4, which forms a part of the "on" timing circuit, charges with respect to this reference level toward the voltage level of bus 21 which is coupled to terminal11 through the series connected elements comprised of potentiometer P2 and resistor R7. Once a voltage at the anode 17 of Q2 exceeds the voltage at gate 19 by the aforementioned amount, Q2 switches into the conducting state and remains on due to the holding current flowing through the series path comprised of resistors R6 and R13 and capacitor C4. Since the energy stored in C4 during the charging interval cannot be dissipated instantaneously, the voltage at the common terminal 20 berween C3 and C4 is abruptly pulled negative with respect to input terminal L2 by the order of 10 volts. This abrupt negative voltage transition is coupled to anode 16 of Q1 through capacitor C3 so as to reverse bias Q1 and cause it to turn off and revert to the blocking state. After approximately 100 milliseconds, the charge on C4 is equalized by way of current flow through resistors R6 and R13 so as to establish a reference voltage level which represents the sum of the voltage drops across CR9 , Q2 (which is now conducting) and CR6. At this time, C3 begins to charge with respect to this voltage level by way of potentiometer P1 and resistor R5 during the "off" period. Once the voltage at the anode 16 of Q1 exceeds the voltage reference at gate 18 by the above mentioned predetermined level, Q1 triggers on and remains on as described above. The energy which was stored in capacitor C3 cannot immediately be equalized and as a result abruptly drops negative to couple a negative voltage transition of the order of 10 volts with respect to line terminal L2 through capacitor C4 to the anode 17 of Q2 causing Q2 to turn off. The alternating "on-off" timing cycles are repeated in this fashion unless and until the line source S is removed from terminals L1 and L2.

Temperature compensation of the timing circuit is achieved by using the $V_{ak}$ negative temperature coefficient of diodes CR5 and CR6, respectively, in the "on" and "off" time periods to compensate for the $V_{ag}$ negative temperature coefficient of Q1 during "off" and Q2 during "on" periods.

OUTPUT CIRCUIT

The output circuit is comprised of a transistor Q3 and an electronic switch Q4 which is preferably a triac, as well as associated resistors, diodes and capacitors.

Transistor Q3 is connected in emitter follower fashion to functionas as an emitter follower amplifier to control current to the gate 23 of Q4.

During the "on" period, when Q2 is in the blocking state, the voltage at the base of Q3 is determined by the voltage divider action of resistors R8, R9, R10 and R11 with the base of Q3 being connected to the common terminal 24 berween resistors R10 and R11. During this period of time, current flows from the common terminal 25 between resistors R1 and R2 through R12 and diodes CR7 and CR8 to gate 23 of Q4, causing Q4 to conduct and thereby establish a closed circuit path between terminal L2 and terminal T2 so as to energize external load L. The voltage at the emitter of Q3 causes Q3 to be reverse biased and thereby blocked from conducting.

During the "off" period, Q2 is turned on to clamp the voltage at the gate 19 to a value of less than 1 volt. This voltage is reflected to the base of Q3 through the divider circuit of R9, R10 and R11 so as to forward bias the base of Q3 relative to its emitter. Q3 then conducts to divert current away from the gate 23 of Q4.

The forward voltage drops across diodes CR7 and CR8 are utilized to establish a turn-on voltage threshold sufficient to prohibit Q4 from conducting as a result of the small voltage drop across Q3 when it is in the conducting state.

The resistor-capacitor network R14 and C6 function as a snubber to reduce commutated *dv/dt* to a value approximately less than 1 volt per microsecond to insure that triac Q4 will not retrigger due to the rate effect.

RESET CIRCUIT

The reset circuit performs two functions, (1) resetting the timing capacitors C3 and C4 rapidly once power has been removed; and (2) assuring that the cycling timer will always start with an "on" time period when the line source is reapplied.

Once line voltage is removed from L1 and L2 at any point in the timing circuit and the power supply voltage decays to a level such that Q1 or Q2 will not remain conducting, diodes CR3 or CR4 (depending upon which of the two is conducting) function in conjunction with R6 and R13 to discharge their associated timing capacitors containing residual charge to a level of a fraction of a volt in less than 2 seconds. Further discharge continues from the timing capacitor to its respective charging potentiometer and resistor (P1 and R5 or P2 and R7) until a zero charge remains across the timing capacitor. If power is interrupted during the "on" period, the charge on timing capacitor C4 will decay exponentially through CR4 and resistors R6 and R13 to a fraction of a volt within the 2 second reset time. The remaining charge on C4 will discharge toward 0 volts exponentially with a time constant equal to the sum of potentiometer P2, resistors R6, R7 and R13 and capacitor C4. If power is reapplied during this final discharge period, Q2 may trigger on first due to the additional voltage across C4 which has been impressed across the anode 17 of Q2. To prevent Q2 from triggering, a threshold voltage is established by diode CR9 which is provided in the Q2 cathode circuit.

TRANSIENT SUPPRESSION CIRCUITRY

The transient suppression circuitry of the cycling timer is comprised of an LC filter network comprised of RF choke 27 and capacitor C7, a *dv/dt* suppression network comprised of capacitor C6 and resistor R14 and output driver and triac gate bypass capacitors C8 and C9.

The choke/capacitor (LC) network 27–C7 functions to:

1. reduce the transient levels from approximately 1500 volts peak-to-peak to less than 400 volts which is the maximum blocking voltage of triac Q6; and
2. cooperate in conjunction with R14 and C6 to reduce the blocking dv/dt to less than 1 volt per microsecond to prevent rate retriggering of Q4.

Capacitors C8 and C9 are employed to bypass conducted RFI around the output driver transistor Q3 and triac Q4 to prevent transient triggering.

FUSING

Cycling timer 10 contains an ultra-fast current limiting fuse F1 which is coordinated to prevent damage to the normally opened solid state output switch Q4 due to either a short circuit condition in the external load circuit or due to current surges resulting from high voltage transients which may appear in the 120 volt supply source S.

It can be seen from the foregoing description that the present invention provides a novel solid state cycling timer in which alternately occurring "on" and "off" cycles continually recycle themselves and are provided with adjustable means 14 and 15 for adjusting the "on" and "off" timing intervals over a range from the order of 0.5–50 seconds. The circcuitry is designed so as to start any cycle with an "on" timing interval and to automatically reset and be ready to initiate a new cycle upon removal and subsequent reapplication of line voltage.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A solid state timer for repetitively connecting and disconnecting an a.c. source to a load in a cyclical manner comprising:

first means coupled across said source for developing a regulated d.c. output;

first and second voltage detector means each having anode, gate and cathode electrodes;

said cathode electrodes being coupled to one terminal of said source;

first and second voltage reference circuits coupled between said d.c. output and the gate electrodes of their associated voltage detector means for establishing a constant voltage reference level at the gates of their associated voltage detector means;

firs and second timing circuits each being coupled between said d.c. output and the anode electrodes of their associated voltage detector mens to turn their associated voltage detectors on when the voltage at the output of the timing circuit exceeds the reference level;

said first and second voltage reference circuits each having a time delay element, the time delay element of said first voltage reference circuit having a greater time delay value than the time delay element of said second voltage reference circuit to cause said second voltage reference circuit to reach its reference level before said first voltage reference circuit reaches its reference level;

solid state switch means being coupled in series with said soruce and said load;

said switch means having a control electrode;

means coupled between said second voltage reference circuit and said control electrode for controlling the state of said switch means whereby said switch means always begins operation in a conductive state when said source is activated due to the time delay elements employed in said voltage reference circuits.

2. The solid state timer of claim 1 wherein said first and second timing circuits are each comprised of a capacitor and an adjustable variable resistance means;

a common resistance means being coupled between said d.c. output and one terminal of the capacitors in said first and second timing circuits;

said variable resistance means each being coupled between said d.c. output and the remaining terminal of their assocaited capacitor;

the common terminal between each capacitor and its associated variable resistance means being coupled to the anodeof its assocaited voltage detector means;

the capacitors of said first and second timing circuits being connected in series between the anodes of said first and second voltage detectors to abruptly turn off the voltage detector which was previously turned on when the capacitor associated with the voltage detector in the off state is charged to a voltage level which exceeds the reference level applied to the gate of its associated voltage detector.

3. The solid state timer of claim 1 wherein said voltage detectors are each comprised of a programmable unijunction transistor having an anode gate and a cathode electrode.

4. The solid state timer of claim 2 further comprising first and second diodes each coupled between said d.c. output and the common terminals of their associated timing circuits for rapidly discharging the timing circuit capacitors whenever said source is removed or deactivated.

5. The solid state timing circuit of claim 1 further comprising diode means coupled to said cathode of the coltage detector means associated with said second voltage circuit to compensate for any residual charge remaining in the capacitor or the timing circuit associated with said second voltage reference circuit and thereby prevent this voltage detector means from turning on first.

6. The solid state timer of claim 1 wherein said control means is comprised of emitter follower means which is adapted to turn said solid state switch on when said emitter follower means is turned off and vice versa;

diode means coupled between the control electrode of said solid state switch and said emitter follower means to provide a threshold level sufficient to prevent said control means for erroneously turning said solid state switch on when said emitter follower means is conducting.

7. The solid state timer of claim 1 further comprising a resistor and a capacitor connected in series across the solid state switch to prevent erroneous re-triggering of the solid state switch.

8. The solid state timer of claim 1 wherein said solid state switch is a triac.

9. The solid state timer of claim 1 wherein said voltage reference circuits are each comprised of at least first and second resistors coupled in series across said d.c. output and said one source terminal;

said timing elements being capacitors coupled in parallel across one of said resistors.

* * * * *